United States Patent [19]

McKellen

[11] 4,204,032

[45] May 20, 1980

[54] ELECTRO-CHEMICAL CELLS OR BATTERIES

[75] Inventor: Patrick E. McKellen, Bramhall, England

[73] Assignee: Unigate Limited Co., London, England

[21] Appl. No.: 967,459

[22] Filed: Dec. 7, 1978

Related U.S. Application Data

[63] Continuation-in-part of Ser. No. 791,444, Apr. 27, 1977, abandoned, which is a continuation of Ser. No. 500,782, Apr. 26, 1974, abandoned.

[30] Foreign Application Priority Data

Sep. 14, 1973 [GB] United Kingdom .............. 43368/73

[51] Int. Cl.$^2$ ........................................... H01M 12/06
[52] U.S. Cl. ...................................... 429/13; 429/27; 429/101
[58] Field of Search ........................... 429/13, 27, 101

[56] References Cited

U.S. PATENT DOCUMENTS 4,135,039  1/1979  Jenkins ................................... 429/27

FOREIGN PATENT DOCUMENTS 1258502  12/1971  United Kingdom ..................... 429/27

*Primary Examiner*—Donald L. Walton
*Attorney, Agent, or Firm*—Sughrue, Rothwell, Mion, Zinn and Macpeak

[57] ABSTRACT

A zinc halogen cell having a zinc containing anode and a halogen consuming cathode, comprising a casing capable of withstanding above atmospheric pressure within which the cathode and anode are disposed and containing a zinc halide solution electrolyte incorporating means for storing the halogen liberated at the cathode on recharge and for supplying the halogen to the cathode on discharge.

10 Claims, No Drawings

ELECTRO-CHEMICAL CELLS OR BATTERIES

This is a continuation-in-part of Ser. No. 791,444, filed Apr. 27, 1977, now abandoned, which is in turn a continuation of Ser. No. 500,782, filed Apr. 26, 1974, also abandoned.

BACKGROUND OF THE INVENTION

1. Field of the Invention

This invention relates to improvements in electro-chemical cells or batteries and more particularly to zinc halogen cells or to batteries of cells preferably using chlorine as the halogen and excluding fluorine but it may be iodine or bromine preferably in gaseous form. Such a cell or battery may be as described in United Kingdom Letters Patent Specification No. 1,258,502, U.S. application Ser. No. 804,215, now U.S. Pat. No. 4,105,829.

2. Description of Prior Art

British Pat. No. 1,258,502, U.S. application Ser. No. 804,215 describes a cell or a battery of cells, the cell comprising a casing, a porous halogen storing electrode forming the cathode, a zinc bearing electrode forming the anode, the electrode being immersed in a liquid zinc halide electrolyte solution, a halogen gas inlet to the casing, a gas flow-path in the casing from the gas inlet to the interstices of the halogen storing electrode, and positive and negative electric conductors leading from the electrodes to terminals accessible to the outside of the casing. The cell is in a halogen gas circuit including a halogen gas cylinder, a pressure regulated valve to control the flow of gas from the cylinder to the casing interior, an ultra violet lamp for the removal of undesirable gases such as hydrogen from the circuit, and a halogen gas liquifier connected to the cylinder, the latter being in the circuit between the valve and the liquifier. An aqueous return may be provided from the liquifier to the cell to return water, which normally has other constituents, into the cell or battery electrolyte. The porous carbon electrode acting as a cathode is made up of a number of electrode structures each comprising a substrate of anodizable metal selected from the metals of Group IV(A) and Group V(A) of the Periodic Table according to Mendeleef having permanently associated therewith at least one coherent stratum of substantially porous carbon. The preferred anodizable metal is titanium. The substrate is preferably in the form of an open mesh such as expanded metal, an apertured sheet of the metal or a porous sheet of the metal having a pore size for example of 3–25 thousandths of an inch diameter, and perferably having a pore size larger than the size of the carbon particle in the crumb, which is the preferred form of the carbon particles and binder. When titanium is used, it is preferable to use titanium of commercial purity having mechanical hardness of I.M.I cp 115 or 130. Zinc bearing electrode forming the anode may be formed by a titanium mesh as for the cathode which is coated or otherwise treated with zinc. The crumb is pressed onto the substrate at a pressure of at least 2 tons psi.

The cathode may be made up of the electrode structure, the spaces in each cathode between adjacent cathode structures being used to supply the chlorine gas to the surfaces of the porous carbon of the structure.

In such a cell or battery during discharge the halogen e.g. chlorine in gaseous form, is supplied to the cathode from the external storage system and on recharging, the halogen gas is liberated on the surfaces of the cathode, rises to the surface of the electrolyte, escapes or is removed from the cell casing, compressed and stored for reuse in a subsequent cycle. The gas may be treated to remove hydrogen and other impurities before it passes to the storage capacity. In operation the halogen gas if frequently wet which necessitates the use of materials inert to the corrosive gas for making the ancillary equipment such as ducts and storage capacities, e.g. high pressure cylinders used in the aforesaid cells or batteries.

It has been found in operating such cells under an internal pressure equal to atmospheric pressure the cell is polarisation limited in output due to the diffusion rate limitation of the halogen e.g. chlorine into the electrolyte solution.

The main object of the present invention is to provide a cell or battery of the zinc halogen type in which the power to weight ratio is increased.

It is known that the solubility of chlorine gas in zinc chloride solution is a function of the temperature and pressure in the space within which the halogen and zinc chloride are contained, so that an increase in pressure within the space permits a greater concentration of the chlorine in solution where it becomes the active cathode. It is also known that solvents exist for the halogens which exhibit this function at ambient temperatures and pressures, suitable solvents for chloride for example being carbon tetrachloride and sulphuryl chloride and such solvents can be in liquid or solid form. It is also known that chlorine gas at normal atmospheric temperatures e.g. 2°–28° C. is liquified at a pressure of about 75 lbs/sq.in but at any pressure above 148° C. chlorine is unliquifyable.

SUMMARY

According to the present invention a rechargeable zinc halogen electric current producing cell comprising a casing, at least one gaseous halogen cathode support structure within said casing and formed of a substrate of anodizable metal or alloy selected from the metals of Groups IVA and VA of the Periodic Table according to Mendeleef having permanently mounted thereon a coherent stratum of crumb-like porous carbon, a zinc containing anode within said casing, a separator in said casing separating said cathode support structure and said anode to prevent cathodic halogen molecules contacting said anode but permitting the passage of halogen ions, a zinc halide electrolyte within said casing in substantial surface contact with said gaseous halogen in said cathode support structure and with said anode, the internal casing temperature and pressure being such as to maintain said halogen in a gaseous state at any pressure in excess of two atmospheric pressures with a minimum temperature within said casing of 2° C. and a halogen circuit including means for storing said gaseous halogen liberated at said cathode support structure on recharge and means to supply gaseous halogen to said cathode support structure on discharge.

DESCRIPTION OF PREFERRED EMBODIMENTS

Preferably the cell is operated at a pressure between 2 and 10 atmospheres.

The halogen e.g. chlorine may be contained either in solution in the electrolyte or in any solvent present in addition to the electrolyte and such cells may be operated at elevated pressures in excess of atmospheric pressure up to pressures of several atmospheres providing the halogen remains in gaseous form except where dissolved.

The cell may include a solvent for the halogen, a suitable solvent being carbon tetrachloride or sulphuryl chloride although any halogen solvent may be used which is inert to the constituents of the cell. Where the halogen solvent is employed, this may be contained in cavities in the cathode support structure.

Means may be provided to agitate as by stiring the electrolyte to assist in the diffusion of the ions into and out of contact with the porous carbon of the cathode support structure during cell operation.

Any of the metals of the Groups IVA and VA of the Periodic Table according to Mendeleef or any alloys of them may be used, the preferred metal is titanium since that is the most readily available and the least expensive. It is preferably used in open mesh or expanded metal form. The porous carbon is preferably formed as described in U.S. Ser. No. 839,057 filed Oct. 3, 1977, now U.S. Pat. No. 4,166,870 so that it is of a crumb-like formation having a myriad of voids in which the gaseous halogen e.g. chlorine makes gas-liquid contact with the zinc halogen electrolyte. By using pressure-temperature conditions within the casing which while maintaining the halogen in gaseous condition, the pressure should be in excess of 2 atmospheres but preferably not in excess of 10 atmospheres thereby increasing the solubility of the chlorine in the electrolytes. In addition due to a lowering of the surface tension between the gaseous chlorine and the liquid electrolyte a larger solid liquid gas interface or reaction-zone is created significantly reducing the electrode impedance and permitting greater electrical output. The minimum temperature with the casing is about 2° C. Moreover the cell performance increases as the pressure rises and as a result the halogen tends to be more miscible with the electrolyte. There is an optimum pressure of cell operation at any temperature and electrolyte concentration and therefore a conventional sensor means is preferably provided in the cell to control the pressure so that despite variations of these parameters the pressure is maintained at the optimum value.

The halogen cathode storage structure and the anode must be kept separate to prevent contact of halogen gas with the anode and any suitable separator may be employed which is made of material impervious to halogen molecules but permits halogen ions to pass in the electrolyte operation on charge and discharge of the cell.

Since the chlorine attack on the zinc anode must be contained it is preferred to construct the cell so that the pressure is equalised on both sides of the separator. This is achieved by making the separator sufficiently flexible to accommodate any pressure difference on its opposite i.e. cathodic and anodic sides: alternatively a liquid non-miscible to the electrolyte and non-reactive to the halogen and having a low solubility to chlorine such as fluorinated hydrocarbons e.g. dichlorodifluoromethane may be floated and maintained over the surface of the electrolyte surrounding the anode which must be completely immersed in the electrolyte so that the zinc anode will be immune to chlorine attack. In such cases the separator need not divide the cell hermetically into two compartments containing the cathodic and anodic sides of the cell.

The cell casing may have a halogen outlet and inlet communicating with a halogen storage capacity inside or outside the casing. The heads of the cathodes where several cathodes are used may be interconnected by suitable manifolds or ducting or passages leading to and from the cathodes and the halogen storage capacity within or exterior to the cell casing.

While the halogen during charge may be liberated on the outer side of the cathode and/or within the hollow interior of a hollow cathode, means should be provided to collect the halogen and pass it to the storage capacity and when the storage capacity operates under elevated pressure a solvent for the halogen may be incorporated in the halogen storage capacity. Such storage capacity may retain the halogen at high pressures with or without a solvent for the halogen and the halogen may be retained in the storage capacity as liquid halogen.

The halogen storage capacity may be external to the cell casing and receive the halogen from the cell under pressure generated by electrolysis during charge or recharge, and deliver it through cavity type electrodes to the porous carbon surfaces thereon during discharge.

If desired means may be provided, such as a mechanical stirring mechanism, for stirring up the chlorine solvent within the cell thus assisting in the diffusion of the chlorine into or out of the cell or within the cell.

Also if desired an emulsifying agent may be provided in the cell to aid emulsification of the halogen e.g. chlorine solvent with the electrolyte whether it is in liquid or gelled form.

In one embodiment of the invention the cells are each made with head spaces above the electrolyte and above or forming part of the chlorine electrode, i.e. the cathode, and in an assembly of cells to form a battery these head spaces may be connected together with a manifold. This manifold may form a chlorine storage space or be connected to a separate chlorine storage space disposed in the cell, or outside the cell.

Such a storage space may contain the chlorine solvent and the whole cell system operates under pressure of 1 to 10 atmospheres providing that the chlorine within the cell casing is in gaseous form.

Where the chlorine storage capacity is external to the cell, either in the casing or outside the casing, the chlorine may be passed to the storage space from the cell by a pump or through a non-return valve, the chlorine pressure being generated by electrolysis during charge. During discharge the chlorine is delivered from the storage capacity through the cathodes which are formed with an internal cavity to receive the gas and permit it to pass through the porous carbon of the cathode to the outside thereof.

I claim:

1. A rechargeable zinc halogen electric current producing cell comprising a casing, at least one gaseous halogen cathode support structure within said casing and formed of a substrate of anodizable metal or alloy selected from the metals of Groups IVA and VA of the Periodic Table according to Mendeleef having permanently mounted thereon a coherent stratum of crumb-like porous carbon, a zinc containing anode within said casing, a separator in said casing separating said cathode support structure and said anode to prevent cathodic halogen molecules contacting said anode but permitting the passage of halogen ions, a zinc halide electrolyte within said casing in substantial surface contact with said gaseous halogen in said cathode support structure and with said anode, the internal casing temperature and pressure being such as to maintain said halogen in a gaseous state with a minimum temperature within said casing of 2° C. and a pressure of between 2 to 10 atmospheres, and a halogen circuit including means for storing said gaseous halogen liberated at said cathode support structure on recharge and means to supply gaseous halogen to said cathode support structure on discharge.

2. A zinc halogen electric cell according to claim 1 wherein said halogen is in a solvent present in said casing in addition to said electrolyte.

3. A zinc halogen electric cell according to claim 2 wherein said solvent is selected from the group containing carbon tetrachloride and sulphuryl chloride.

4. A zinc halogen electric cell according to claim 1 wherein agitating means are provided in said casing to assist in diffusion of said halogen into and out of the voids in said porous carbon of said cathode structure.

5. A zinc halogen electric cell according to claim 1 wherein an emulsifying agent is provided in said casing, and said halogen is in a solvent in said casing, said emulsifying agent aiding emulsification of said solvent with said electrolyte.

6. A zinc halogen electric cell according to claim 1 comprising a number of porous carbon electrode support structures mounted in said casing capable of occluding the halogen cathode in the pores thereof, a number of zinc containing anodes in said casing separated from said porous carbon electrodes, heads connected to said electrode support structures, at least one manifold interconnecting said heads, a halogen storage capacity separate from said electrode support structures and connected to said manifold, a zinc halide electrolyte solution in said casing, means for storing said halogen liberated at said cathode support structure, on recharge of said cell, and means for delivering said halogen to said cathode support structure on discharge of said cell.

7. A zinc halogen electric cell according to claim 1 wherein said halogen storage capacity is external to said casing and receives said halogen from said casing under pressure generated by electrolysis during charge and recharge of said cell, and delivers said halogen to said electrode cavities during discharge.

8. A zinc halogen electric cell according to claim 1 wherein head spaces are provided in said casing above said electrolyte and forming part of the occlusion space for said halogen acting as the cathode.

9. A zinc halogen electric cell according to claim 1 wherein the halogen pressure in said casing is generated by electrolysis during charge and recharge and a pump is provided to circulate halogen to said storage capacity for said halogen outside said electrode support structures and a non-return valve is provided in said halogen circuit between said electrode support structure and said storage capacity.

10. In the operation of a rechargeable zinc halogen electric cell comprising:
 (a) a casing;
 (b) storage means external to said casing for storing halogen;
 (c) at least one halogen electrode structure located within said casing comprising an aperture substrate consisting essentially of an anodiazable metal selected from the group consisting of groups IV (A) and V (A) of the periodic table according to Mendeleef and having an inherent oxide layer thereon, said substrate having permanently associated therewith at least one coherent permeable stratum of a mixture of substantially porous carbon and a polymeric binder, said carbon structure having been produced by pressing said mixture of porous carbon and binder onto said substrate at a pressure greater than 2 tons p.s.i. to provide a flexible halogen electrode structure, said halogen electrode structure being adapted to provide a space therein in communication with said external storage means for molecular hydrogen into and through which space molecular halogen can move;
 (d) at least one metal bearing anode structure located within said casing including a zinc-containing material supported on an electrically conducting substrate; and
 (e) a separator in said casing separating said halogen electrode structure and said anode adapted to prevent passage of halogen molecules but to permit passage of halogen ions;
 (f) positive and negative electric conductors leading from said electrode structures to terminals accessible to the outside of said casing; said casing being adapted to hold a body of liquid and flowable zinc halide electrolyte in contact with each of said electrode structures, the improvement comprising operating said cell at an internal pressure of greater than 2 atmospheres.

* * * * *